(12) United States Patent
Clapp et al.

(10) Patent No.: US 6,459,533 B1
(45) Date of Patent: Oct. 1, 2002

(54) TUNEABLE OPTICAL FILTERS

(75) Inventors: Terry V Clapp, Herts (GB); Alan Robinson, Harlow (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/603,080

(22) Filed: Jun. 26, 2000

(51) Int. Cl.[7] .......................... G02B 27/00; G02B 6/32; G02F 1/03; H01S 3/08
(52) U.S. Cl. .................. 359/578; 359/577; 359/260; 385/37; 372/92; 372/102
(58) Field of Search ................... 359/578, 579, 359/577, 260; 385/13, 30, 37, 14; 372/92, 97, 99, 102, 27

(56) References Cited

U.S. PATENT DOCUMENTS

| | | | | |
|---|---|---|---|---|
| 5,091,983 A | * | 2/1992 | Lukosz | 385/13 |
| 5,150,236 A | * | 9/1992 | Patel | 349/198 |
| 5,212,584 A | * | 5/1993 | Chung | 359/579 |
| 5,317,576 A | * | 5/1994 | Leonberger et al. | 372/102 |
| 6,075,799 A | * | 6/2000 | Uchida et al. | 372/27 |
| 6,233,381 B1 | * | 5/2001 | Borrelli et al. | 385/37 |

* cited by examiner

*Primary Examiner*—Andrey Chang
(74) *Attorney, Agent, or Firm*—Lee, Mann, Smith, McWilliams, Sweeney & Ohlson

(57) ABSTRACT

An optical waveguide format tuneable optical filter is formed using Bragg grating reflectors to define one or more optical cavities of a Fabry Pérot etalon, the or each cavity of the etalon including one or more slots containing a controllable refractive index medium, for instance a silicone gel whose index is regulated by Joule heating, or a polymer dispersed liquid crystal whose index is electric field regulated. Strong coupling coefficient (~ a few tens $mm^{-1}$) gratings may be made using lithography to form linear arrays of buried high index inclusions extending along the waveguide core axis.

16 Claims, 9 Drawing Sheets

TUNEABLE OPTICAL FILTERS

BACKGROUND TO THE INVENTION

This invention relates to the construction of tuneable optical filters, and finds particular, but not necessarily exclusive, application in the provision of filters for use in wavelength division multiplexed (WDM) optical transmission systems.

One known form of tuneable filter employs a bulk-optics format of Fabry Pérot etalon in which wavelength tuning is effected by mechanically controlling the magnitude of the optical cavity length, for instance by the use of one or more piezo-electric elements. For use in optical waveguide transmission applications, a disadvantage of the use this form of filter is that it requires conversion of the light to be filtered from waveguided format into free-space format, and back again into waveguided format. Additionally there are problems in the making of suitable multilayer interference stacks for the optical cavity defining reflectors of the etalon, and in managing the tuning of that etalon.

Another form of tuneable filter is constituted by a Bragg reflector formed by irradiating, with a fringe pattern of UV light, a length of single mode doped silica optical fibre, and then adjusting the effective pitch of that grating by subjecting the fibre to tensile strain of adjustable magnitude. Drawbacks associated with this approach as currently practised include the fact that the magnitude of the photorefractive effect in such optical fibre typically limits the coupling strength ($\kappa$) of the resulting grating to not more than about 1 to 2 mm$^{-1}$, and such small values of the coupling strength ($\kappa$) produce inconveniently slow roll-off at the edges of the reflection waveband.

Additionally, there are problems associated with creep in the fibre and the structure employed to strain it. Moreover the tuning range is limited by the amount of strain to which the fibre may be safely exposed.

A further form of tuneable filter has been proposed, this being constituted by a Bragg reflector formed by irradiating, with a fringe pattern of UV light, a length of single mode polymer optical waveguide, and providing that waveguide with a Joule heater, by operation of which the effective pitch of the grating is of adjustable magnitude through the agency of the enhanced value of the thermal coefficient of refractive index of the polymer compared with that of a silica optical fibre waveguide. A somewhat larger value of the coupling strength ($\kappa$) should be capable of being achieved in the polymer waveguide than is achieved in the doped silica fibre waveguide, but the silica waveguide has the potential advantage of better mechanical stability than polymer. Moreover there is a not entirely insubstantial mass of polymer to be Joule heated in the case of the polymer tuneable filter, and this militates against speed of response.

SUMMARY OF THE INVENTION

The present invention is directed to a construction of a waveguide format of tuneable optical filter that is capable of a reasonably fast response.

According to the present invention, there is provided a waveguide format tuneable optical filter which filter includes first and second Bragg grating reflectors formed in an optical waveguide supported upon a substrate, which reflectors define between them a Fabry Pérot optical cavity that includes a phase adjuster formed by at least one slot interrupting the waveguide and containing a controllable refractive index medium.

The invention is applicable not only to single Fabry Pérot tuneable filters having only two reflectors defining between them a single optical cavity, but also to compound Fabry Pérot tuneable filters having more than two reflectors defining between them more than one optical cavity, analogous to certain forms of multi-cavity designs of dielectric interference stack filters.

Preferred forms of controllable refractive index media include media with relatively high temperature coefficients of refractive index and media whose refractive index is directly addressable by means of an applied electric field.

The fine structure in the waveguide core that defines the Bragg gratings may be created by selective exposure to UV light, but other methods providing easier access to the manufacture of gratings with larger values of the coupling strength ($\kappa$) will generally be preferred. One such method involves employing ion implantation to create the fine structure, implanting for instance ions of phosphorus. Preferably this ion implantation is performed after only part of the material that is to form the waveguide core has been deposited, the rest of the material being deposited after the ion implantation. In this way, the regions of raised refractive index produced by the localised ion implantation may be buried within the core material to lie substantially symmetrically about the core axis. (This ion implantation method is described in greater detail in the specification entitled, 'Optical Waveguide Bragg Reflection Gratings', U.S. patent application Ser. No. 08/896,092; filed Jul. 17, 1997.) Another method of producing the fine structure also involves interrupting the deposition of the core material, in this instance interrupting it to allow the deposition and lithographic patterning of a thin layer of material having a higher refractive index than that of the core material. The small thickness of this intermediate layer, in comparison with that of the rest of the core, means that it is more readily patterned with the high resolution detail necessary for providing the requisite Bragg grating structure.

Other features and advantages of the invention will be readily apparent from the following description of preferred embodiments of the invention, from the drawings and from the claims.

DETAILED DESCRIPTION OF PREFERRED EMBODIMENTS

Figure 1:
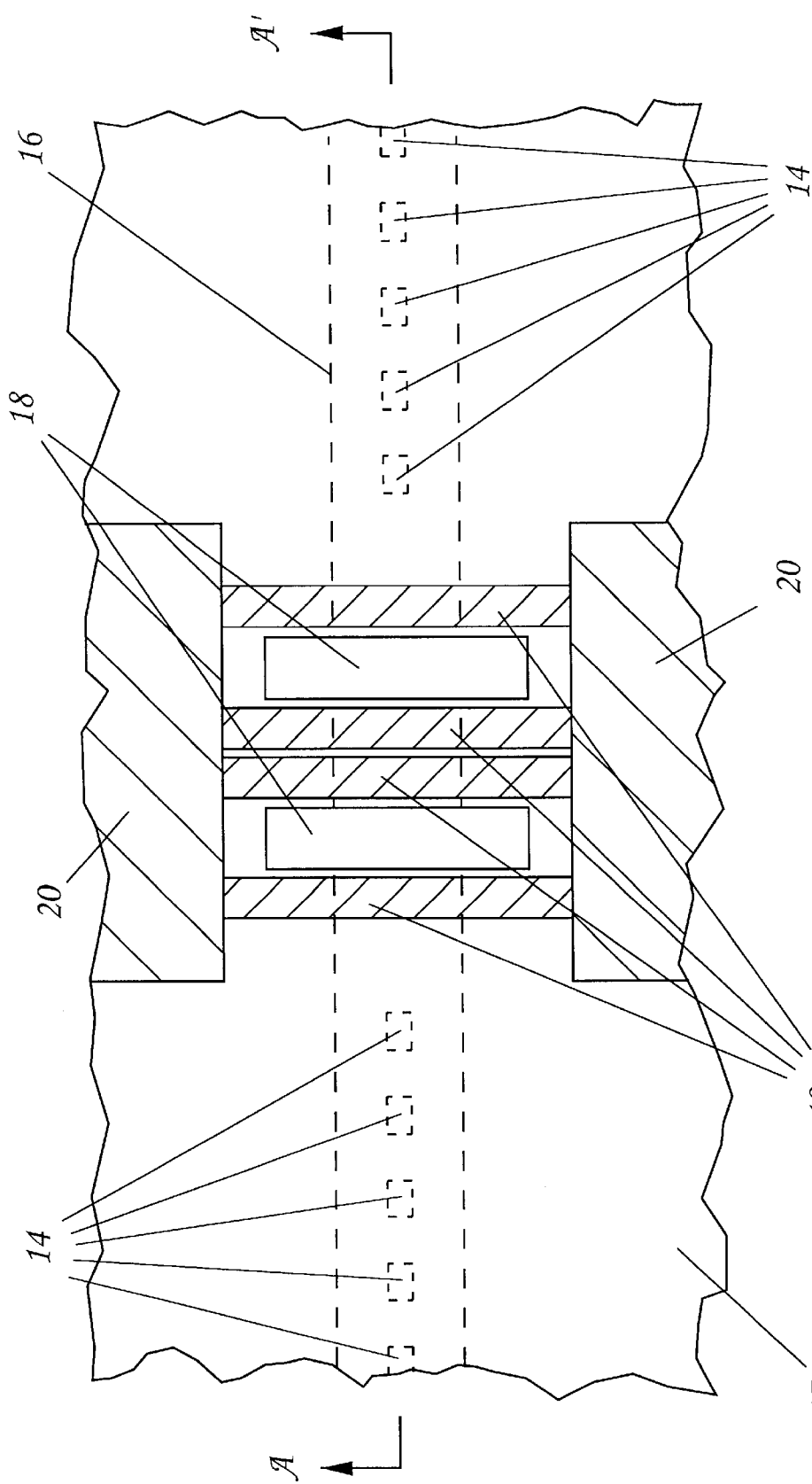
FIG. 1 schematically depicts a scrap planar view of a portion of a Fabry Pérot tuneable filter embodying the invention in a preferred form, FIG. 2 schematically depicts a scrap sectional view of the filter along the line A–A' of FIG. 1, FIGS. 3, 4 and 5 schematically depict scrap sectional views of the filter along the line B–B' of FIG. 2 at successive stages in the manufacture of the filter, FIG. 6 schematically depicts a scrap planar view of a portion of a Fabry Pérot tuneable filter similar to that of FIG. 1, but with the difference that it has an electrode pattern designed for use with an electric field effect tuning instead of thermo-optic effect tuning.
Figure 2:
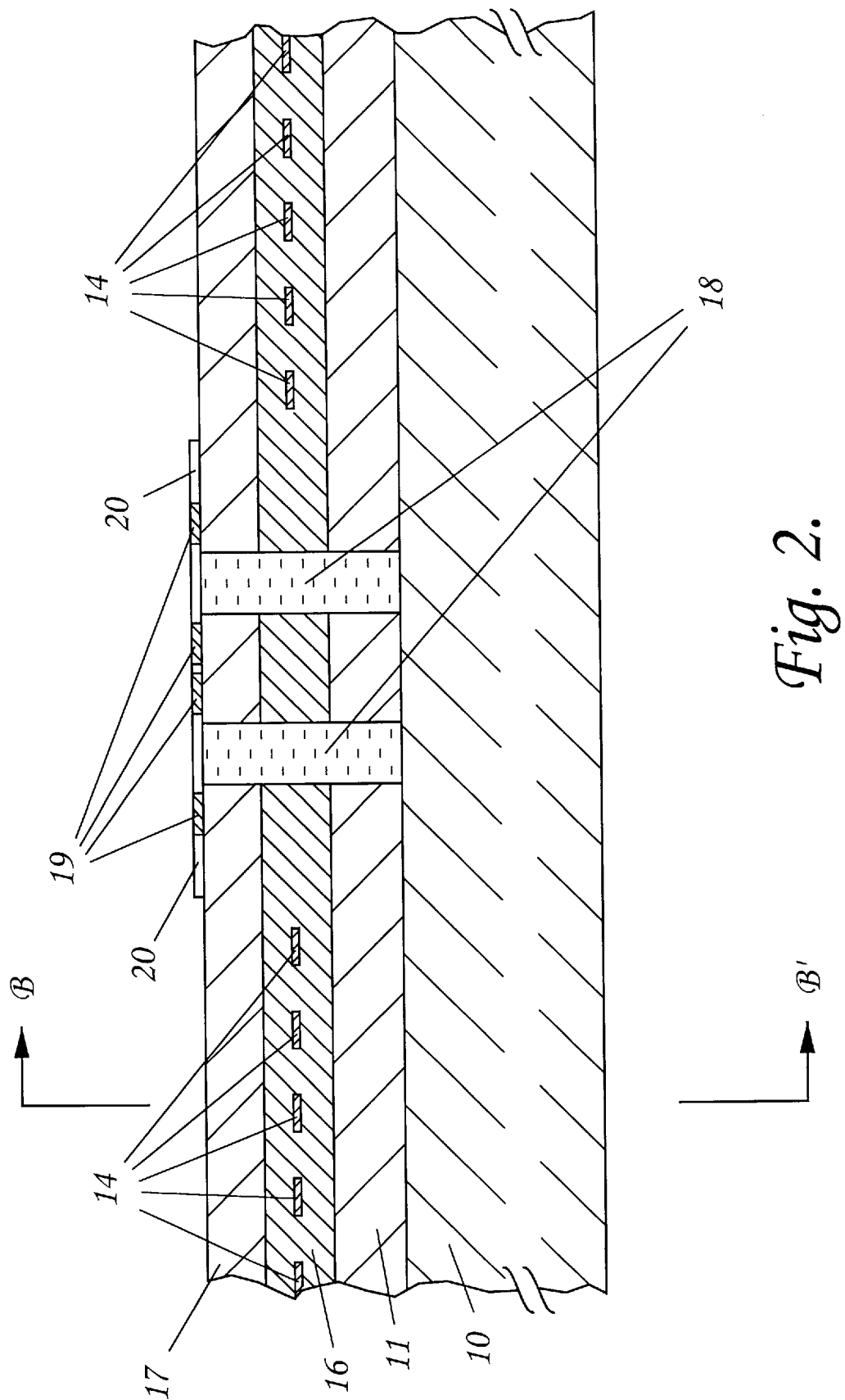
Figure 3:
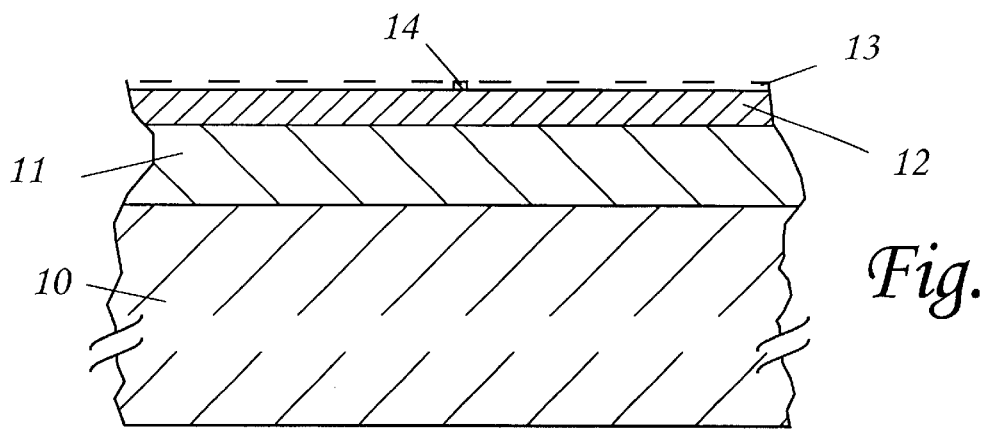
Figure 4:
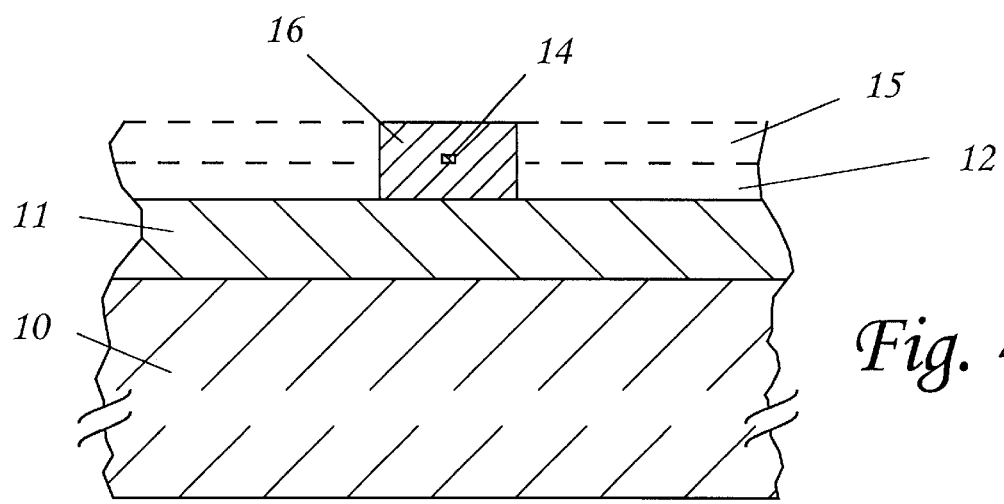
Figure 5:
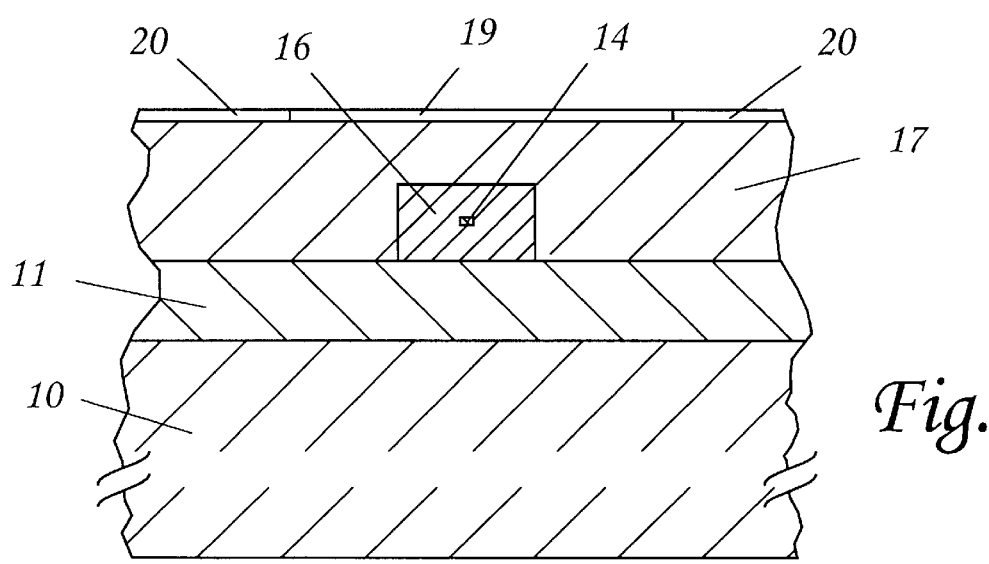

Referring in the first instance to FIGS. 1 to 5, a Fabry Pérot tuneable filter embodying the invention in a preferred form is constructed in planar waveguide format, by which term is meant that the waveguide structure of the filter is created upon a planar surface of a substrate 10, typically a single crystal silicon substrate. Upon this substrate is formed or deposited a lower cladding glass layer 11 (buffer layer), which is typically a silica layer, for instance a thermal oxide layer, or a doped silica layer deposited for instance by plasma enhanced chemical vapour deposition (PECVD). The thickness of the lower cladding layer typically lies in the range 12 $\mu$m to 20 $\mu$m. Upon this lower cladding layer is deposited, for instance by PECVD, a layer 12 of core glass that has a higher refractive index ($\Delta n \approx 11 \times 10^{-3}$) than that of the underlying lower cladding glass layer, and that has a thickness equal to approximately half the intended thickness of the waveguide core of the completed device. Thus the thickness of the core glass layer 12 typically lies in the range 2.5 $\mu$m to 3.0 $\mu$m. Next, upon the core glass layer 12 is deposited a thin, typically ~0.1 $\mu$m thick, inclusion layer 13 of high index material having a refractive index (typically equal to or greater than 1.6) significantly higher than that of the core glass layer 12. The material of this inclusion layer may for instance be polysilicon or a silicon oxynitride, deposited for instance by low pressure chemical vapour deposition (LPCVD). The layer 13 is lithographically patterned, for instance using standard E-beam lithography followed by reactive ion etching down to the underlying core glass layer 12, to produce sets of dice (cuboids) 14 of the inclusion layer material (FIG. 3). This is followed by the deposition of a second layer 15 of core glass. Typically this second core glass layer 15 is substantially identical with, and deposited in the same way as, the underlying core glass layer 12. The second core glass layer 15, together with the underlying core glass layer 12, is lithographically patterned, for instance similarly using E-beam lithography followed by reactive ion etching, in this instance down to the underlying cladding glass layer 11, to form a waveguide core 16 in which are embedded the sets of high refractive index inclusion material dice 14. This patterning is followed by the deposition of an upper cladding glass layer 17 which, like the cladding glass layer 11, has a thickness typically lying in the range 12 $\mu$m to 20 $\mu$m, is substantially index matched with the material of layer 17, and is typically made of a doped silica deposited for instance by PECVD.

At each individual die of a dice set 14, the propagation constant ($\beta$) of the waveguide is locally raised in comparison with the $\beta$ of the waveguide at locations intermediate the dice, and also those altogether remote from them. Arranging to provide the dice of a set 14 at a fixed periodicity ($\Lambda$) therefore produce a Bragg reflecting grating with a coupling coefficient $\kappa$ determined by the difference in the $\beta$-values at and between the dice. In the case of a simple Fabry Pérot filter having only two spaced Bragg grating reflectors defining between them a single optical cavity, there is typically no need to apodise the gratings, and so the individual dice of each set will normally be identical, each typically having a length equal to approximately half the Bragg period $\Lambda$ so as to produce a near 1:1 'mark:space' ratio. In its turn, the Bragg period is chosen to produce a reflector with its reflection pass-band approximately centred on the centre wavelength of the tuning range over which the tuneable filter is designed to operate. Particularly if low polarisation sensitivity is desired for the filter, the patterning to produce the dice sets 14, and that to produce the waveguide core 16, are arranged to result in the formation of a waveguide core of substantially square cross-section waveguide core with the high refractive index inclusion material dice sets 14 disposed substantially symmetrically along its axis, the individual members of the dice sets also having substantially square cross-sections. However, departures from squareness may be required to satisfy other design criteria. These other design criteria are more likely to arise in the case of compound Fabry Pérot filters having more than two spaced Bragg grating reflectors defining between them more than one optical cavity. Apodisation of gratings and the provision of different grating reflectors with different coupling coefficients $\kappa$ are more likely to be desirable features of such compound filters, and can conveniently be arrived at by a tailoring of the widths of the individual dice of a dice set, or otherwise altering their relative shapes.

The filter is rendered tuneable by including within the optical cavity a portion of a medium 18 whose refractive index is controllable. By this means the optical path length of the optical cavity is rendered adjustable. This medium may be located in a slot extending across the waveguide 16 in a region between two dice sets 14. The presence of such a slot necessarily introduces some measure of optical coupling loss between the two portions of waveguides on opposite sides of that slot. The amount of this loss needs to be kept small because it lowers the finesse of the optical cavity. The wavelength tuning range is determined by the product of the axial extent of the controllable refractive index medium with the range of values over which its refractive index can be varied. If the required wavelength tuning range is so great that it requires an axial extent of the tuning medium so great that its accommodation in a single slot would provide excessive loss, then the amount of loss can be reduced by using the medium instead to fill a set of n identical slots optically in series, these slots having an equivalent aggregate width. In this way use is being made of the fact that, by reducing the magnitude of the gap by a factor 'n', while at the same time arranging to have a concatenation of waveguide sections defining a set of 'n' of the smaller gaps optically in series, matters can be arranged to provide an aggregate range of wavelength adjustment comparable with that of the single large gap. Resulting from the fact that, as the separation between the ends of identical waveguides with co-aligned axes increases, so the coupling loss begins to increase in a manner which resembles an exponential increase (inasmuch as the rate of increase increases with increasing separation), the coupling loss of one of these smaller gaps is much more than n-times smaller than that of the large gap, while the aggregate coupling loss of the series combination of all the smaller gaps is approximately n-times larger, than that of a single small gap. Therefore the aggregate coupling loss of the series combination of all the 'n' smaller gaps is much less than the coupling loss of the single large gap. Hence, with the appropriate choice of the factor 'n', the aggregate coupling loss can generally be made small enough to be acceptable. (Such use of multiple gaps is described in further detail in the specification entitled, 'Slotted Monolithic Optical Waveguides', U.S. patent application Ser. No. 09/346/320; filed Jul. 2, 1999) By way of example only, FIGS. 1 and 2 specifically illustrate the situation in which the number of concatenated controllable refractive index medium filled slots 18 is two.

In the case of a tuneable filter employing a controllable refractive index medium whose index is temperature controlled, i.e. a thermo-optically tuned filter, a suitable medium is a silicone, for instance a siloxane gel. Such materials typically exhibit a relatively large thermo-optic coefficient, their chemical composition can be reasonably readily tailored to provide a suitable base refractive index at a suitable desired temperature, and they are low modulus materials with good resistance to peeling and cracking under cyclical strain. The desired value of refractive index is a value that, within the working temperature range, is substantially matched with the effective refractive index of the waveguide in order to minimise Fresnel reflection where the medium interfaces with the waveguide. The medium is heated using Joule heating strips 19, typically of chrome, deposited upon the upper cladding layer 17 and providing a resistive connection between terminal pads 20, typically of gold with an underlayer of titanium for adhesion to the glass of the upper cladding layer.

Figure 6:
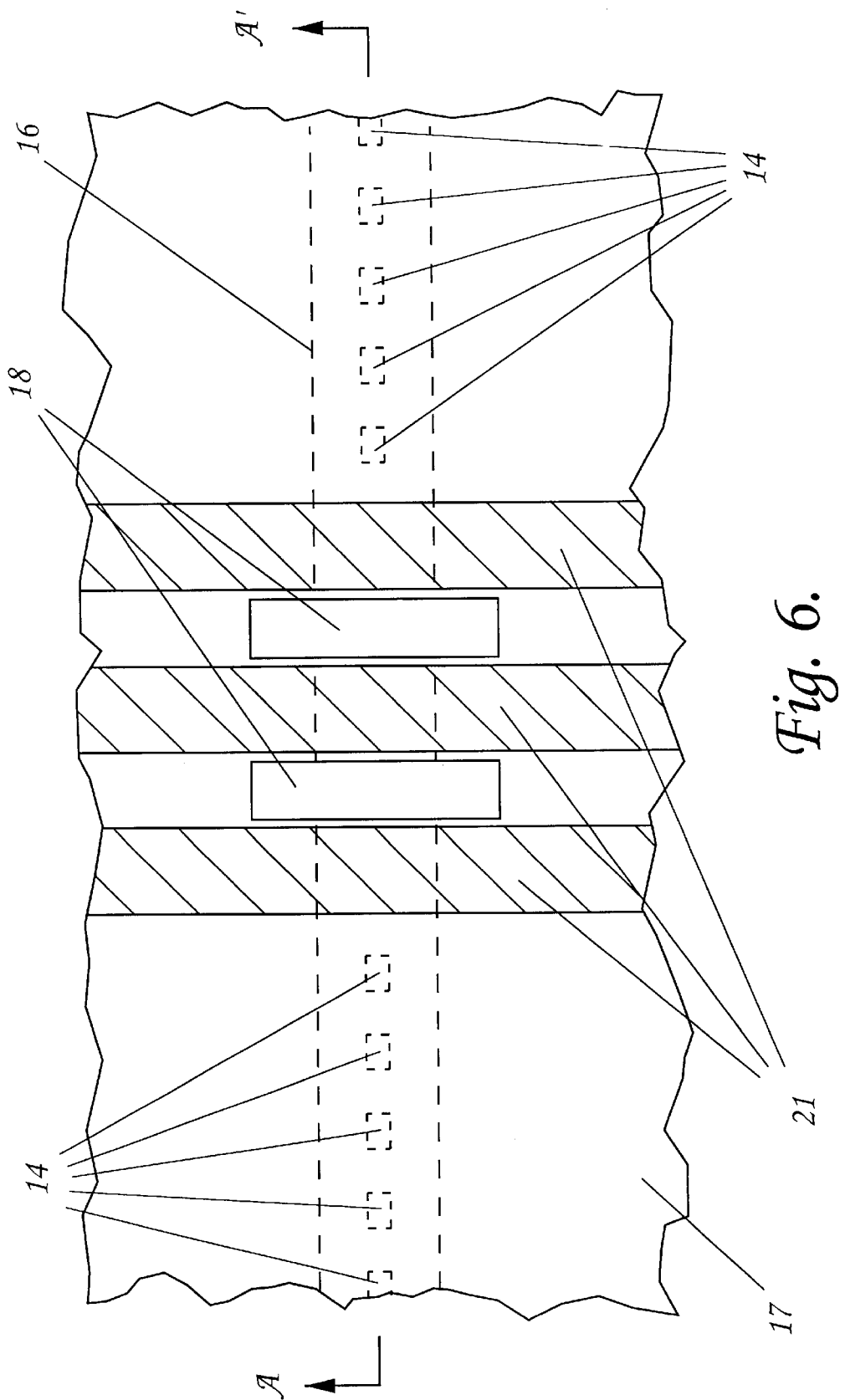

In the case of a tuneable filter employing a controllable refractive index medium whose index in electric field controlled, a suitable medium is a polymer dispersed liquid crystal (PDLC). The polymer is designed to have a refractive index substantially matched with the effective refractive index of the waveguide in order to minimise Fresnel reflection where the polymer interfaces with the waveguide. Under the influence of an applied electric field of increasing magnitude extending in the axial direction of the waveguide, the mean molecular orientation of liquid crystal molecules within each dispersed droplet changes from a random orientation towards an approximately uniaxial orientation. The scattering of light by the droplets is minimised by matching the mean index of the liquid crystal droplets with the index of the polymer, and by the use of a dispersion with a fine droplet size, a diameter of the order of, or less than, 200 nm being typical. The heating strips 19 and terminal pads 20 of the thermo-optically controlled filter are replaced by a set of electrodes, arranged on either side of each slot, for instance as depicted at 21 in FIG. 6.

Figure 7:
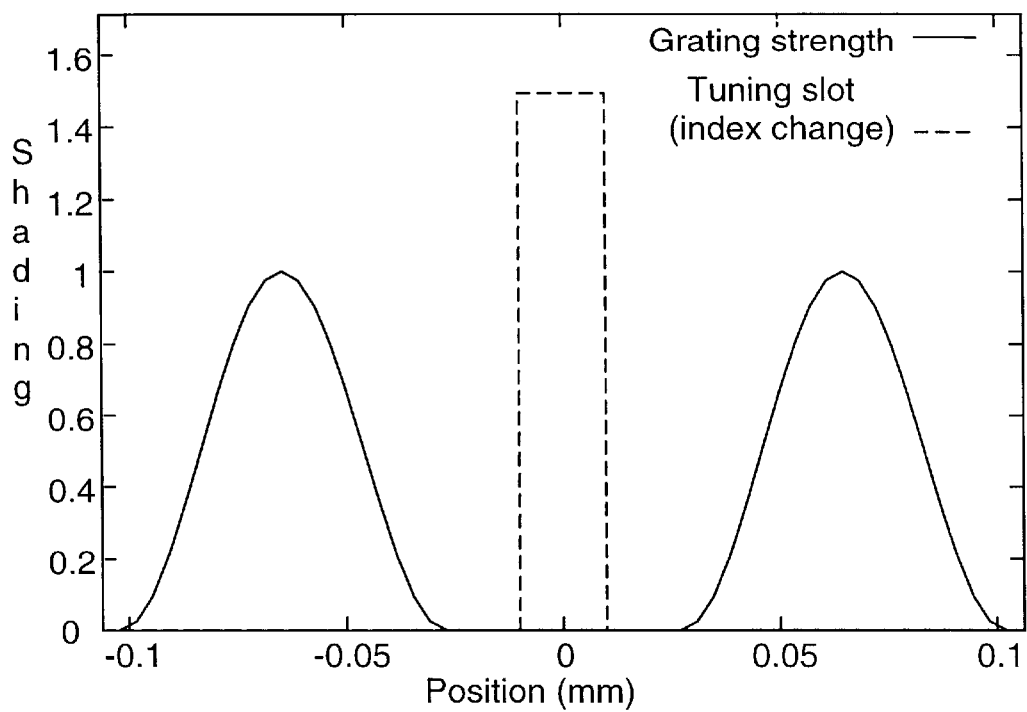
FIG. 7 is a diagram illustrating a simple single cavity filter design according to the present invention.
Figure 8:
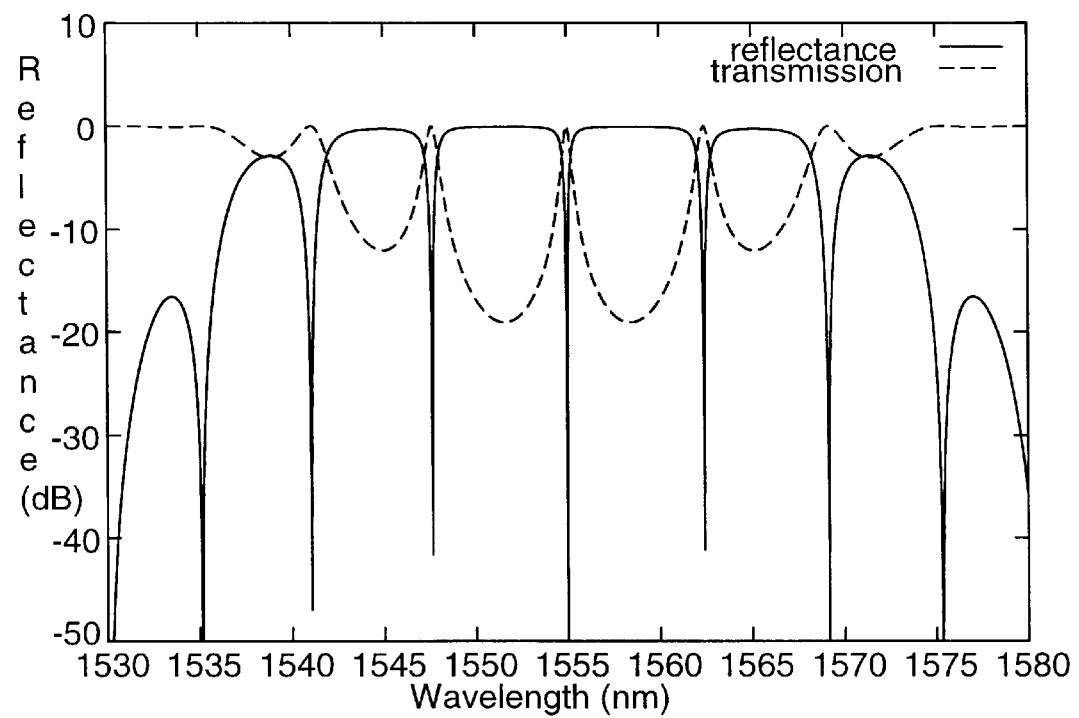
FIG. 8 shows the calculated spectral response of the filter of FIG. 7, FIGS. 9 and 10 respectively show, in respect of the filter design of FIG. 7, how the calculate transmission pass-band position and shape changes with temperature and coupling coefficient.

Attention is now turned to specific design parameters of the tuneable filters of FIGS. 1 to 6. FIG. 7 is a diagram illustrating a simple single cavity filter design consisting of two apodised gratings defining an optical cavity that includes 20 $\mu$m in aggregate thickness of tuning slot(s) filled with a thermo-optic medium assumed to have a temperature coefficient of $3.7 \times 10^{-4}$ K$^{-1}$, giving an index change of 0.02 for a 60° Celsius temperature change. FIG. 8 shows the calculated spectral response of this filter. The overall response, envelope is about 30 nm wide. The roll-off outside this window is determined by the apodisation of the individual reflecting elements. In this example, a raised cosine profile has been used, although apodisation is quite inessential if the response in the centre region is the main concern. Within the 30 nm envelope, a series of narrow bands with low reflectance/high transmittance are present, centred on the design centre wavelength of 1555 nm. The free spectral range of 800 GHz is determined by the cavity length.

Figure 9:
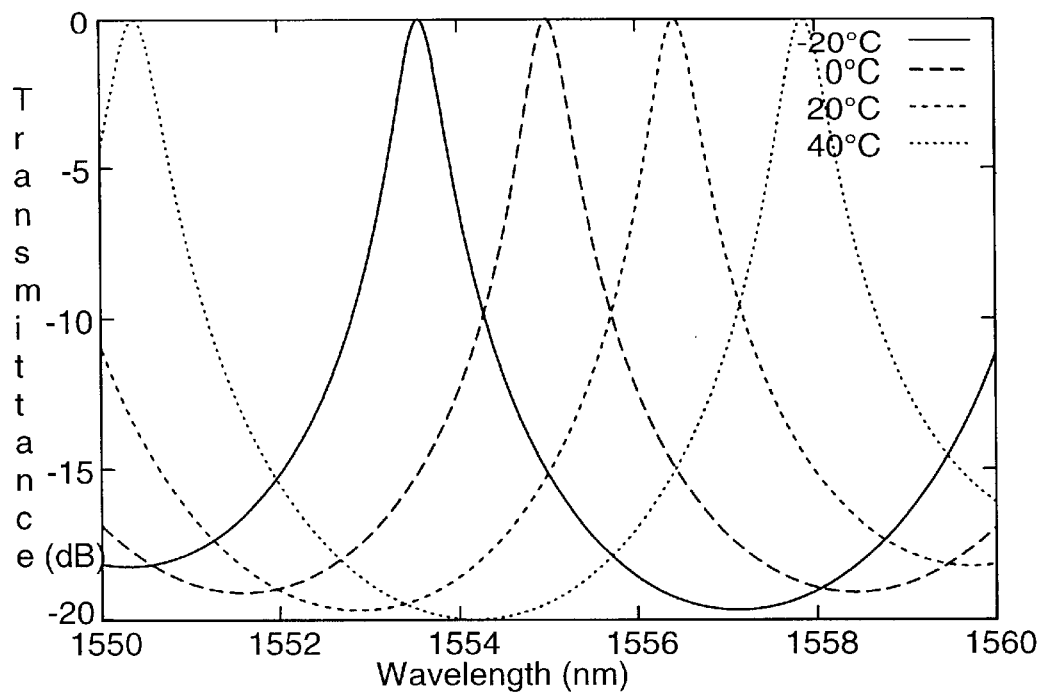

FIG. 9 shows, for four different temperature values (−20°, 0°, 20° and 40° Celsius), the calculated effect of tuning the cavity by changing the temperature of the thermo-optic medium filling the slot(s). With a 20 $\mu$m slot, a temperature range of 105° Celsius is required to tune over the free spectral range. In practice, the same effect could be achieved, as stated previously, by using two or more narrower slots to reduce the insertion loss. Polymer-dispersed liquid crystals offer an electrically addressable index change of 0.07. This would allow the free spectral range to be covered with a narrower (and therefore lower loss) slot, or set of slots.

Figure 10:
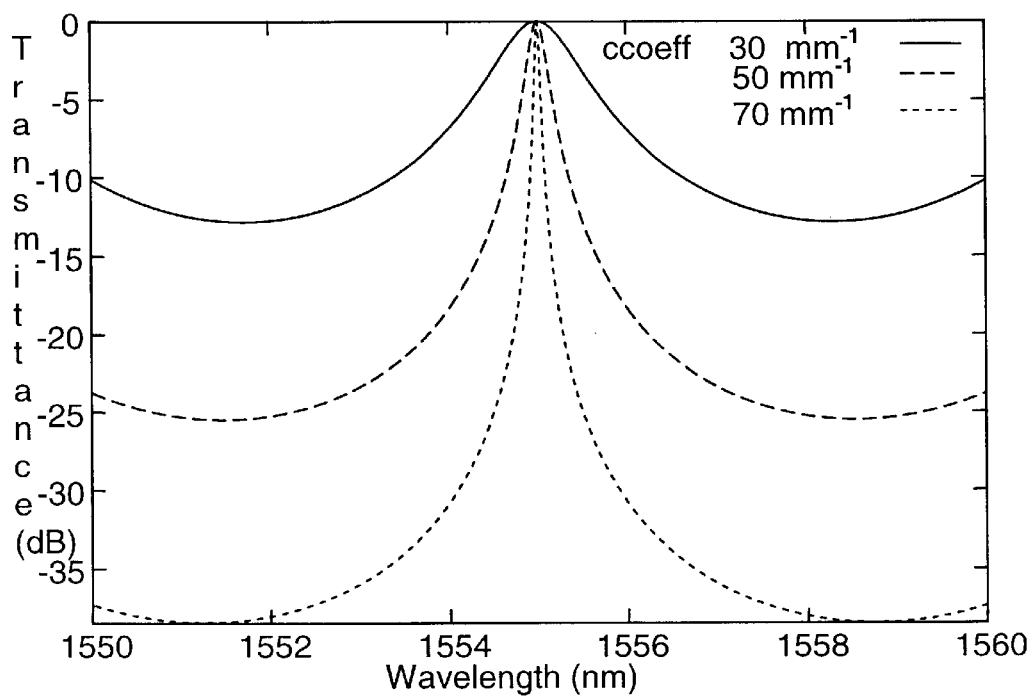

FIG. 10 shows, for three different coupling coefficient κ values (30 mm$^{-1}$, 50 mm$^{-1}$ and 70 mm$^{-1}$.), how the transmission pass band narrows as the coupling strength of the grating increases. A coupling coefficient of 50 mm$^{-1}$ corresponds to a modulation of the mode effective index of approximately 0.05 peak to peak. This is much higher than can be currently achieved with photo-induced gratings in silica waveguide, but is readily accessible using the lithographic techniques described above.

Figure 11:
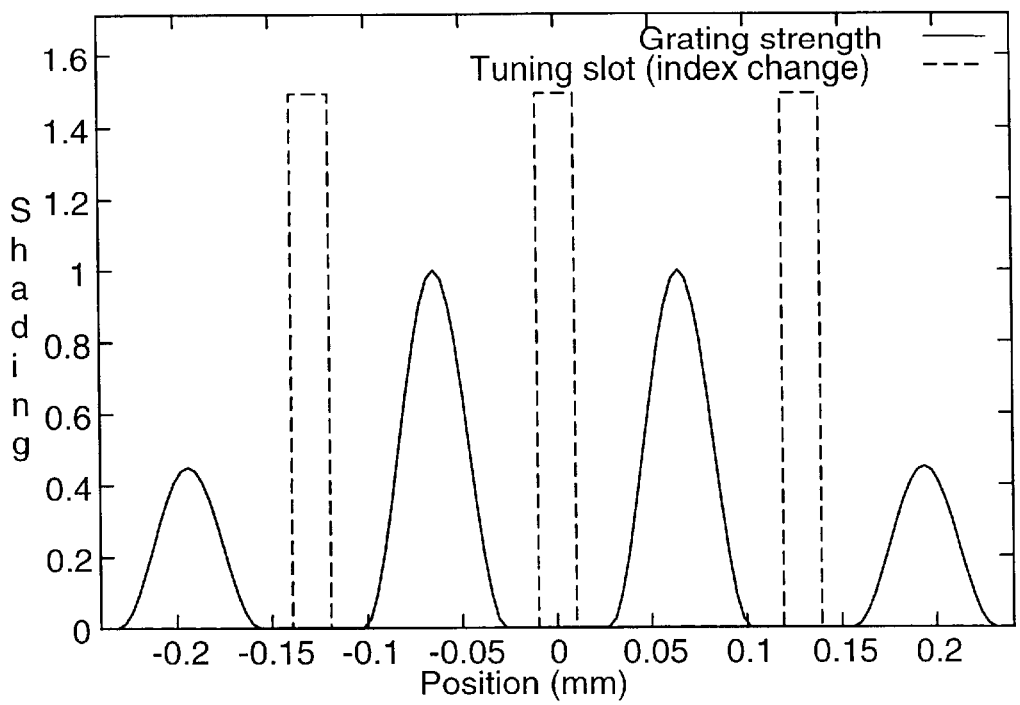
FIG. 11 is a diagram illustrating a compound cavity filter design according to the present invention.
Figure 12:
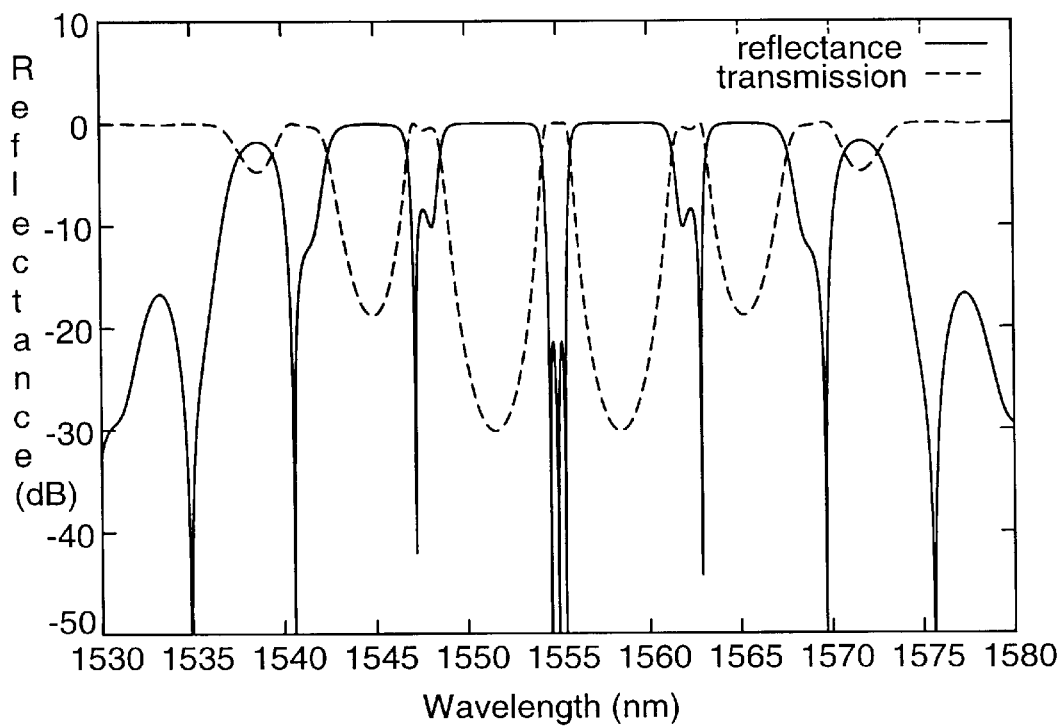
FIG. 12 shows the calculated spectral response of the filter of FIG. 11, FIGS. 13 and 14 respectively show, in respect of the filter design of FIG. 11, how the calculated transmission pass-band position and shape changes with temperature and coupling coefficient.
Figure 13:
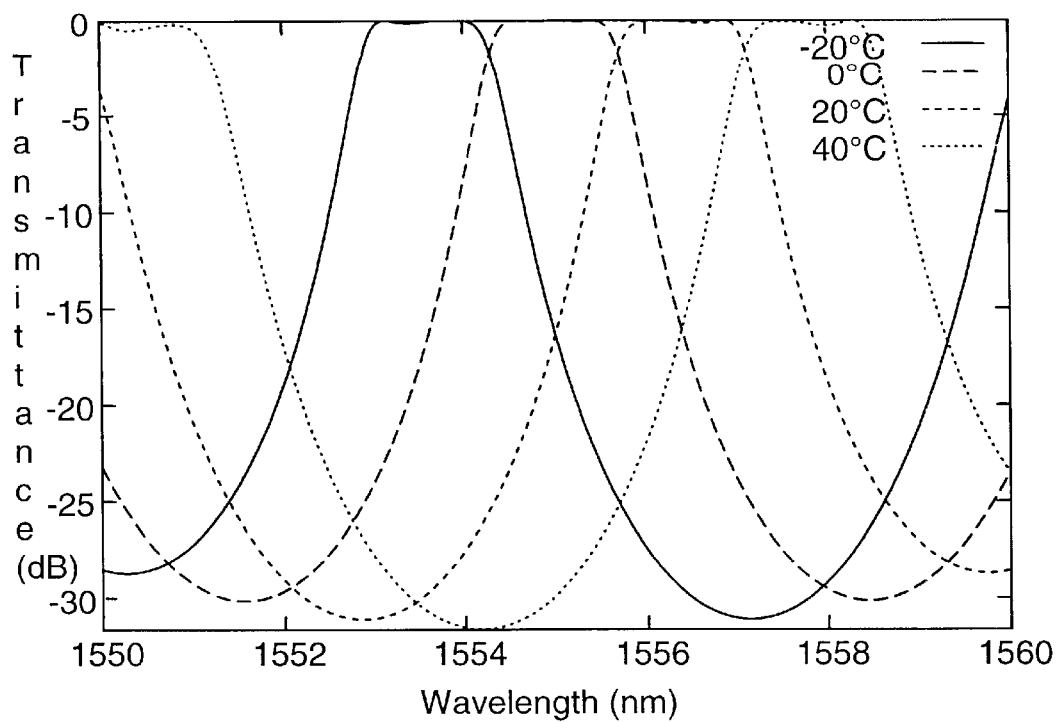
Figure 14:
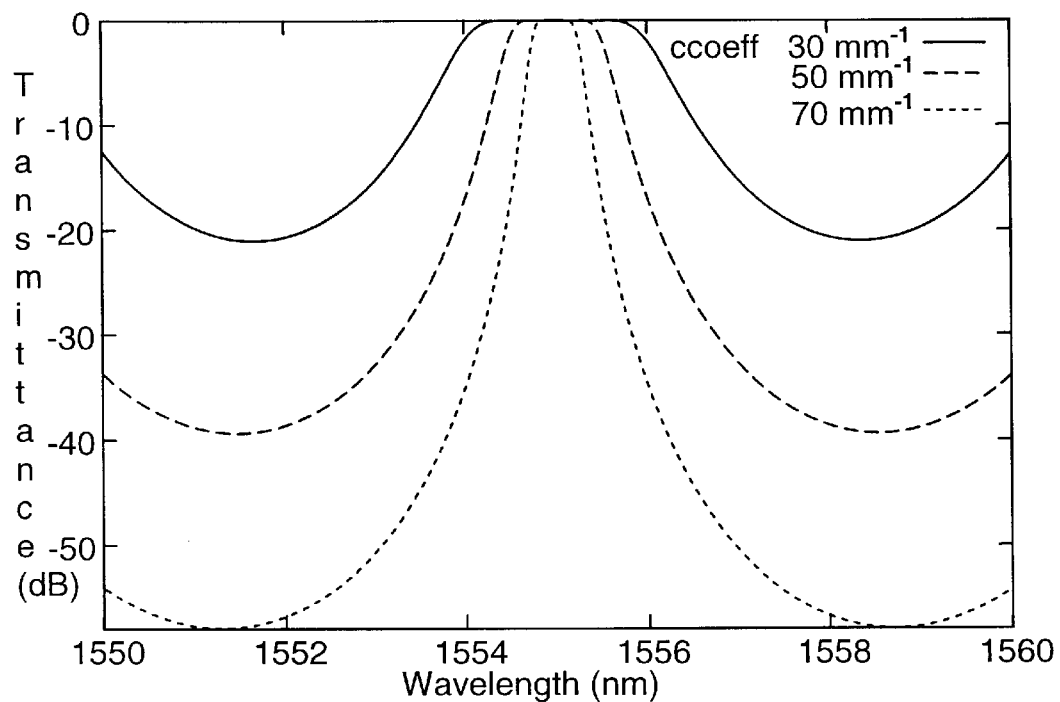
Figure 15:
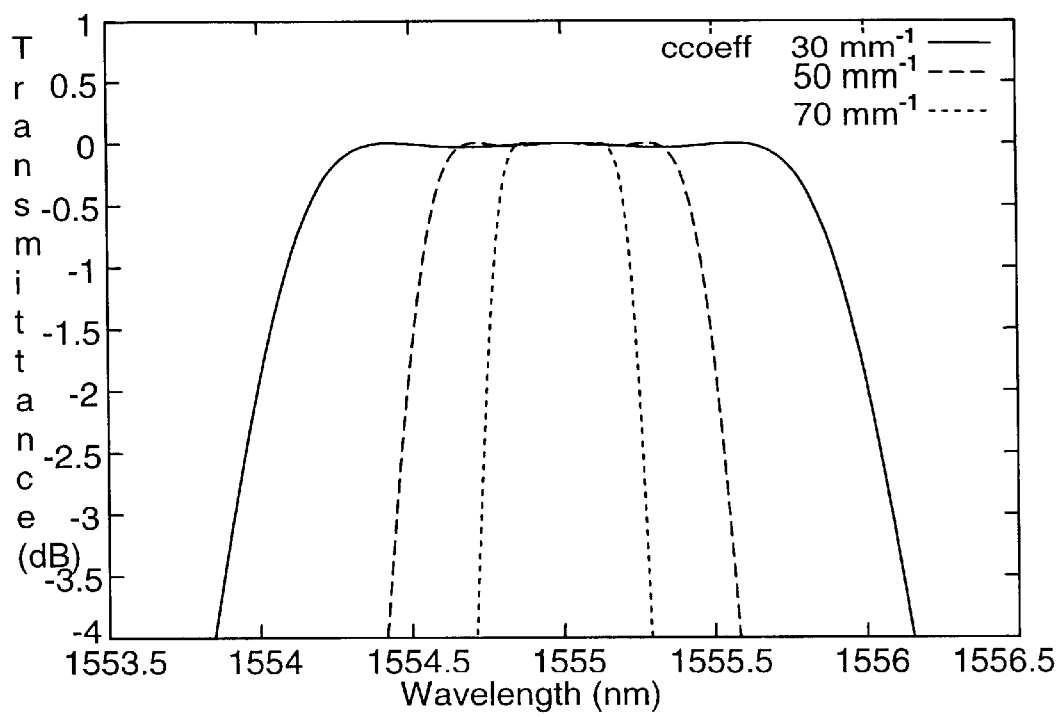
FIG. 15 shows on a finer scale the peaks of the transmission pass-bands of FIG. 14.

The transmission spectra of the single cavity filter either shows poor out of band rejection, or inconveniently narrow a pass band. A potentially generally more useful filter response can be synthesised using compound Fabry Pérot filter designs having more than two reflectors defining between them more than one optical cavity. FIG. 11 depicts an example of such a design, this design having four reflectors defining between them three optical cavities. In this particular instance, the coupling coefficient of the outer two reflectors is only 45% of that of the inner two reflectors. FIG. 12 shows the corresponding calculated spectral response of this filter. The quality of the stop and pass bands degrades away from the design centre wavelength of 1555 nm, although it remains satisfactory over a restricted range of 1550 to 1560 nm, as can be seen from FIG. 13. Provided that no reliance is being placed upon utilising the higher Fabry-Pérot orders, then it may not be worth apodising the grating sections, unless this occurs naturally as part of the mode transformation required between. the high index grating regions and the tuning slots. FIGS. 13 and 14 are the compound cavity counterparts to FIGS. 9 and 10, respectively showing, for the same illustrative temperature and inner reflector coupling coefficient values, how the filter transmission pass-band shape and position changes. FIG. 15 shows on a finer scale the shape of the peaks of the pass-bands of FIG. 14. These figures show that the pass band response is much flatter than the single cavity design of FIG. 7.

Figure 16:
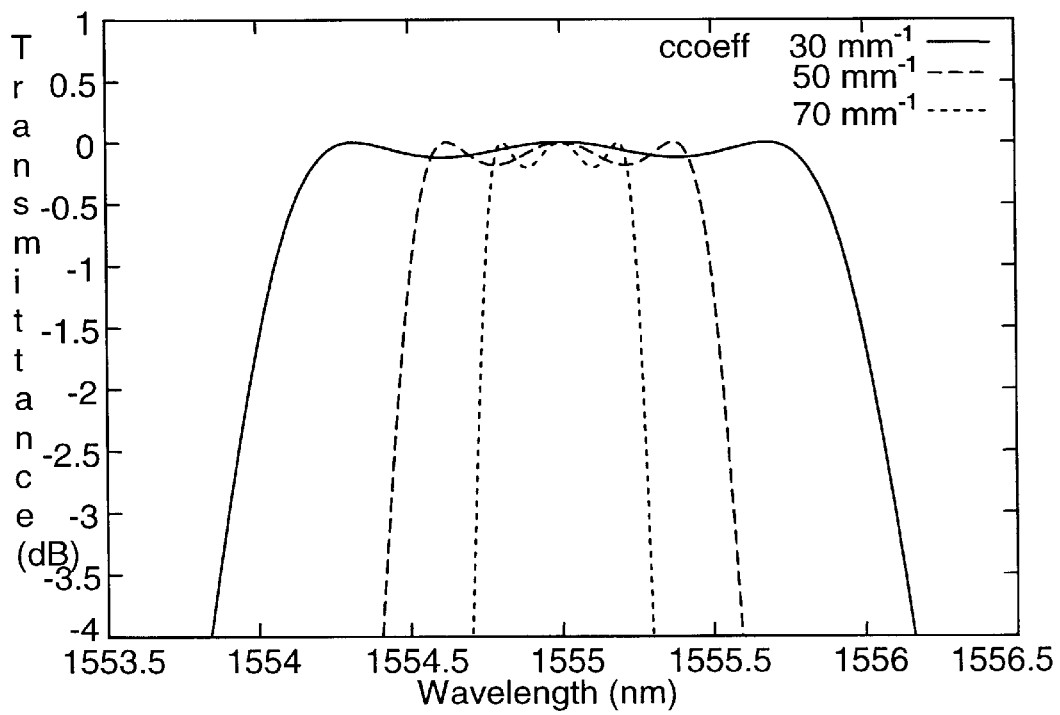
FIG. 16 shows how the peaks of FIG. 15 are changed by a change in the relative coupling coefficients of the inner and outer gratings of the filter design of FIG. 11.

The transmission uniformity within the passband is affected by the ratio of the coupling coefficients of the inner and outer reflectors. FIG. 16 shows, for the same three inner reflector coupling coefficient values, that an increase in ripple occurs when the outer reflector coupling coefficient is increased to 50% of that of the inner reflectors.

What is claimed is:

1. A waveguide format tuneable optical filter which filter includes a waveguide core within which are buried inclusions of a material of higher refractive index than said waveguide core, which inclusions constitute grating elements co-operating to produce first and second Bragg grating reflectors, which reflectors define between them a Fabry Perot optical cavity that includes a phase adjuster is formed by a set of n identical slots interrupting the waveguide which are optically in series, where n is an integer, and said slots are filled with a controllable refractive index medium, wherein n is selected such that the aggregate coupling loss of the series combination of the n slots is less than the coupling loss of a single slot of equivalent aggregate size.

2. A tuneable optical filter as claimed in claim 1, wherein said first and second Bragg grating reflectors constitute a first and second reflector of a simple, Fabry Pérot etalon having only two reflectors defining between them the sole Fabry Pérot optical cavity of the etalon.

3. A tuneable optical filter as claimed in claim 2, wherein the controllable refractive index medium is a medium whose refractive index is controlled by regulation of its temperature using Joule heating.

4. A tuneable optical filter as claimed in claim 3, wherein the controllable refractive index medium is a siloxane gel.

5. A tuneable optical filter as claimed in claim 2, wherein the controllable refractive index medium is a medium whose refractive index is controlled by regulation of the magnitude of an electric field applied across it.

6. A tuneable optical filter as claimed in claim 5, wherein the controllable refractive index medium is a polymer dispersed liquid crystal.

7. A tuneable optical filter as claimed in claim 1, wherein said first and second Bragg grating reflectors constitute a first and second reflector of a compound Fabry Pérot etalon having more than two reflectors defining between them a plurality of Fabry Pérot optical cavities of the etalon.

8. A tuneable optical filter as claimed in claim 7, wherein the controllable refractive index medium is a medium whose refractive index is controlled by regulation of its temperature using Joule heating.

9. A tuneable optical filter as claimed in claim 8, wherein the controllable refractive index medium is a siloxane gel.

10. A tuneable optical filter as claimed in claim 7, wherein the controllable refractive index medium is a medium whose refractive index is controlled by regulation of the magnitude of an electric field applied across it.

11. A tuneable optical filter as claimed in claim 10, wherein the controllable refractive index medium is a polymer dispersed liquid crystal.

12. A tuneable optical filter as defined in claim 1, wherein said inclusions of higher refractive index material are created by ion implantation.

13. A tuneable optical filter as defined in claim 12, wherein said inclusions are created by implanting ions of phosphorus.

14. A tuneable optical filter as defined in claim 12, wherein said ion implantation lie substantially symmetrical about the waveguide core axis.

15. A tuneable optical filter as defined in claim 1, wherein said inclusions are created by deposition and lithographic patterning of a thin layer of material having a higher refractive index than that of the core material.

16. A waveguide format tuneable optical filter, which filter includes first and second Bragg grating reflectors formed in an optical waveguide supported upon a substrate, which reflectors define between them a Fabry Perot optical cavity that includes a phase adjuster formed by a set of n identical slots optically in series where n is an integer, each slot interrupting the waveguide; wherein n is selected such that the aggregate coupling loss of the series combination of the n slots is much less than the coupling loss of a single slot of equivalent aggregate size and each slot containing a controllable refractive index medium.

* * * * *